Oct. 28, 1958     W. E. WALLES ET AL     2,858,237
METHOD FOR TREATING SILICONE RUBBER MATERIALS
AND TREATED ARTICLES THEREBY OBTAINED
Filed April 2, 1956
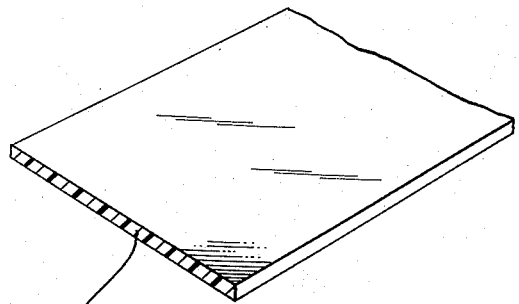
Silicone rubber belt having hydrophilic surface characteristics
INVENTORS.
Wilhelm E. Walles
BY Robert B. Ingraham
Griswold & Burdick
ATTORNEYS United States Patent Office 2,858,237
Patented Oct. 28, 1958

2,858,237
METHOD FOR TREATING SILICONE RUBBER MATERIALS AND TREATED ARTICLES THEREBY OBTAINED

Wilhelm E. Walles and Robert B. Ingraham, Midland, Mich., assignors to The Dow Chemical Company, Midland, Mich., a corporation of Delaware Application April 2, 1956, Serial No. 575,432

7 Claims. (Cl. 117—118)

This invention relates to a method for treating silicone rubber and silicone rubber materials and fabricated articles comprised of compositions that contain silicone rubber and silicone rubber materials so as to overcome their extreme hydrophobic characteristics and to provide them in a form in which they may be wet readily with water and various aqueous solutions and with other liquid substances.

Silicone rubber articles, as is well known, are generally prepared by compounding (with suitable fillers and the like) silicone rubber and silicone rubber materials that are ordinarily comprised of polymers and copolymers of dimethyl siloxane. Beneficially, the polymeric siloxane may contain at least about 80 mole percent of dimethyl siloxane polymerized in the polymer molecule. Copolymers of dimethyl siloxane with phenyl methyl siloxane or with vinyl methyl siloxane may frequently be advantageously utilized. Usually the polymers that are employed for the preparation of silicone rubber materials have degrees of polymerization of at least about 200. The viscosities of such polymers frequently may be between about 10,000 and 100,000 centistokes. The silicone rubber materials may be compounded, for example, with between about 25 and 45 parts by weight of a suitable filler material, such as finely divided silica, for each 100 parts by weight of the polymer that is to be employed. Of course, other types and varieties of silicone rubber and silicone rubber compositions may also be utilized in particular instances for particular purposes.

Silicone rubber articles and materials have many advantageous characteristics and properties including generally, by way of illustration, thermal stability, resistance to attack from most chemical materials and the property of being extremely hydrophobic. While the latter feature may frequently be utilized with especial benefit in the employment of silicone rubber materials, there are occasions when it would be desirable to have silicone rubber with at least its surface in a more hydrophilic form than that in which it is conventionally available, while retaining its other advantageous characteristics in an essentially unaltered form. This may be the case, for example, when silicone rubber materials and articles fabricated therewith are employed in various apparatus, such as conveyor belts and the like in the manufacture of certain synthetic film and related articles.

For instance, when films and similar shaped articles are prepared from latex emulsions comprised of copolymers of vinylidene chloride and acrylonitrile and the like through a coagulation of the polymeric material from the emulsion by casting or otherwise suitably spreading it on a moving rubber belt that has been wet with and carries a coagulating liquid on its surface, it is disadvantageous for the belt to be fabricated from a hydrophobic silicone rubber material of construction, although the other properties of the silicone rubber are particularly desirable to be taken advantage of for such an application. The poor wettability of a silicone rubber belt, however, may cause many irregularities to be imparted to a freshly coagulated film which may be in contact therewith. Analogous situations may often be involved in many other instances where silicone rubber materials may be extremely desirable for particular use applications, excepting for their inhering a partial or complete unadaptability for the purpose as may be occasioned by their hydrophobic nature. Although attempts to improve the wettability of silicone rubber belts have been made by roughening or mechanically abrading their surface, the results that may be obtained by the practice of such techniques are, in general, not completely satisfactory.

It is among the principal objects of the present invention to provide a method for treating silicone rubber and silicone rubber materials and fabricated articles comprised of compositions that contain silicone rubber materials to improve their surface characteristics so that their hydrophobic characteristics may be minimized or completely eliminated. It is among the ancillary objectives of the present invention to provide articles comprised of silicone rubber materials which result from such a treatment. It is a predominating objective of the present invention to accomplish these intendments without detraction from or deletion of the other desirable characteristics and properties of silicone rubber.

According to the present invention, all or any desired portion of an article comprised of a silicone rubber or a silicone rubber material may be made more hydrophilic so as to render it more wettable with aqueous and other liquids by a treatment which comprises subjecting the surface of the silicone rubber to the action of sulfuric acid. The treatment, if it is carefully conducted, has no adverse effect on the silicone rubber materials or on the conventional additament materials such as fillers, pigments and the like which may be employed in their compositions. After the treatment, the surface may be washed clean with water or other agents and the treated product employed satisfactorily in any application whereon it may be advantageous for it to be hydrophilic and substantially uniformly wettable with aqueous and other liquids.

The treatment of the present invention sulfonates the surface of the silicone rubber article to produce silylsulfate groups or substituents thereon which render it more hydrophilic and wettable. It is usually advantageous to employ a concentrated sulfuric acid for the treatment. An acid that contains between about 50 and 96 percent by weight of $H_2SO_4$ may be especially suitable. Generally, a satisfactory degree of treatment or surface modification of the silicone rubber article may be obtained when operating at temperatures between the freezing and boiling points of the acid reagent and, advantageously, at temperatures between about 50 and 100° C. for periods of time ranging from matters of merely several seconds to hours. Frequently, when a concentrated sulfuric acid is employed which contains about 70 percent by weight of $H_2SO_4$, the treatment may be performed suitably at an operating temperature of about 75° C. within a time period in the neighborhood of five minutes.

The results which may be obtained in any particular instance are somewhat interdependent on the nature of the silicone rubber material and the specific physical form or structure in which it is being treated, the strength or effective $H_2SO_4$ concentration of the reagent, the operating temperature and the length of the treatment. Care should be taken to avoid treating conditions which may be too vigorous, as may occur when a higher concentration sulfuric acid is employed at too high a temperature or for too long a period of time. Care should also be taken to employ more moderate treating conditions upon relatively lighter or more delicate fabricated articles and structures of the silicone rubber material. If such precautions are not assiduously observed, the silicone rubber article may be dissolved excessively or may even be caused to degrade and decompose resulting in its being transformed to an unsuitable form. Conversely, the invention cannot be suitably practiced with overly weak treating conditions that may not sufficiently modify the surface of the silicone rubber article to produce a marked and significant alteration in its characteristics from hydrophobic to hydrophilic in nature.

Any desired degree of treatment may be effected. Generally, within the limits of beneficial operating conditions, longer or more intense treatments yield products having more pronounced hydrophilic characteristics and greater wettability. A permanent effect and alteration of the surface characteristics of a silicone rubber article may be obtained by treatment in accordance with the present invention. The treatment may advantageously be performed on silicone rubber articles having any fabricated form or on the polymeric materials prior to their compounding and fabrication. If desired or required for various reasons, only certain preferred areas or portions of a surface may be subjected to the treatment to result in a localized improvement in surface wettability. In many cases the treatment of the invention may also be utilized advantageously to render the surface of a silicone rubber article substantially completely antistatic in character and to have the highest possible affinity for certain dyestuffs, such as Crystal Violet and the like, which may be attained with such a surface. In the annexed drawing there is schematically illustrated a fragmentary portion of a silicone rubber conveyor belt as being representative of the articles whose surfaces may advantageously be sulfonated in accordance with the present invention.

By way of further illustration, a silicone rubber belt fabricated from a type of silicone rubber material similar to that which is available under the trade-name "Silastic Rubber 51" from Dow Corning Corporation of Midland, Michigan, was employed for coagulating on its surface a film from latex of a copolymer of vinylidene chloride and acrylonitrile, containing about 97 percent by weight of vinylidene chloride polymerized in the copolymer molecule. The coagulation was effected by spreading the latex on the surface of the moving belt after it had been wet with a coagulating liquid consisting of an aqueous solution of calcium chloride. The belt had been treated in accordance with the invention prior to its employment by immersing it in 70 percent sulfuric acid for about five minutes at a temperature of about 75° C., then washing it free from acid with water. The treated belt was completely wettable with water, which was enabled as a result of the treatment to spread over the hydrophilic surface of the belt without formation of droplets or similar evidences of hydrophobic surface phenomenon. The belt was employed in a highly satisfactory manner in the apparatus that was used for preparation of the film. The treated belt did not introduce or cause irregularities in the film as had occurred when using an untreated belt having a non-wettable surface. Prior to the treatment of the belt, great difficulty had been encountered with frequent occurrence of film irregularities. The hydrophobic character of the untreated silicone rubber belt had prevented the achievement of a uniform dispersion of the coagulating liquid on the surface of the belt so as to enable an even contact of the coagulant to be made with the copolymeric latex emulsion being spread thereon for coagulation.

Since certain changes and modifications can readily be entered into in the practice of the present invention, it is to be fully understood that all of the foregoing description and specification be interpreted as being merely illustrative of certain of its preferred embodiments.

What is claimed is:

1. Method for treating silicone rubber and silicone rubber materials and fabricated articles comprised of compositions that contain silicone rubber so as to overcome their hydrophobic characteristics and to improve their wettability which silicone rubber materials are comprised of polymers that contain in their molecules at least about 80 mole percent of dimethyl siloxane, said method comprising subjecting the surface of the silicone rubber to a concentrated sulfuric acid that contains between about 50 and 96 percent by weight of $H_2SO_4$ at a temperature between the freezing point and the boiling point of the sulfuric acid until the surface of said silicone rubber becomes hydrophilic.

2. The method of claim 1 wherein the treatment is conducted at a temperature between about 50 and 100° C.

3. The method of claim 1 wherein the concentrated sulfuric acid contains about 70 percent by weight of $H_2SO_4$ and the treatment is conducted at a temperature of about 75° C. for a period of time in the neighborhood of five minutes.

4. The method of claim 1 and including the step of washing the treated article free from sulfuric acid.

5. Silicone rubber having a sulfonated surface.

6. A silicone rubber article characterized in having its surface hydrophilic and wettable with water, said article having a sulfonated surface.

7. A belt in accordance with the superficially sulfonated silicone rubber article of claim 6.

References Cited in the file of this patent

UNITED STATES PATENTS

| 260,441 | Woodward | July 4, 1882 |
| 2,057,717 | Gerke | Oct. 20, 1936 |
| 2,102,456 | Brill et al. | Dec. 14, 1937 |
| 2,400,720 | Staudinger et al. | May 21, 1946 |
| 2,446,536 | Hardy | Aug. 10, 1948 |

OTHER REFERENCES

Irby et al.: "India Rubber World," February 1948 (vol. 177, No. 5, pp. 605–616).